(12) United States Patent
Kim

(10) Patent No.: US 12,365,269 B2
(45) Date of Patent: Jul. 22, 2025

(54) BRAKE DEVICE FOR VEHICLE SEAT

(71) Applicant: Hyundai Transys Inc., Seosan-si (KR)

(72) Inventor: Won Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 205 days.

(21) Appl. No.: 18/363,301

(22) Filed: Aug. 1, 2023

(65) Prior Publication Data

US 2024/0416804 A1 Dec. 19, 2024

(30) Foreign Application Priority Data

Jun. 16, 2023 (KR) .................. 10-2023-0077499

(51) Int. Cl.
| | |
|---|---|
| *B60N 2/16* | (2006.01) |
| *B60N 2/18* | (2006.01) |
| *B60N 2/22* | (2006.01) |
| *B60N 2/225* | (2006.01) |
| *B60N 2/90* | (2018.01) |
| *F16D 43/02* | (2006.01) |
| *F16D 67/02* | (2006.01) |

(52) U.S. Cl.
CPC ............ *B60N 2/168* (2013.01); *B60N 2/1889* (2013.01); *B60N 2/2227* (2013.01); *B60N 2/2254* (2013.01); *B60N 2/938* (2018.02); *F16D 43/02* (2013.01); *F16D 67/02* (2013.01)

(58) Field of Classification Search
CPC .... B60N 2/168; B60N 2/1889; B60N 2/2227; B60N 2/2254; B60N 2/938; B60N 2/165; B60N 2/167; F16D 67/02; F16D 43/02; F16D 41/06; F16D 41/18; F16D 41/20
See application file for complete search history.

(56) References Cited

U.S. PATENT DOCUMENTS

| | | | | |
|---|---|---|---|---|
| 4,614,257 | A * | 9/1986 | Harada | .................. F16D 41/20 |
| | | | | 49/350 |
| 9,074,644 | B2 * | 7/2015 | Sato | ...................... B60N 2/938 |
| 9,821,685 | B2 * | 11/2017 | Kim | ........................ B60N 2/938 |
| 10,661,685 | B2 * | 5/2020 | Kim | ........................ F16D 41/06 |
| 10,814,749 | B2 * | 10/2020 | Kitayama | .............. F16D 41/02 |
| 10,948,040 | B2 * | 3/2021 | Ng | ........................... F16D 67/02 |
| 11,938,847 | B2 * | 3/2024 | Kim | ..................... B60N 2/1685 |
| 2014/0008956 | A1 * | 1/2014 | Golarz | ................. B60N 2/2252 |
| | | | | 297/354.1 |
| 2018/0094679 | A1 * | 4/2018 | Kaku | ..................... F16D 63/008 |
| 2019/0210490 | A1 * | 7/2019 | Sato | ..................... B60N 2/1615 |

(Continued)

FOREIGN PATENT DOCUMENTS

| | | |
|---|---|---|
| CN | 109642621 A | 4/2019 |
| KR | 10-2014-0055585 A | 5/2014 |

(Continued)

OTHER PUBLICATIONS

Clement Vachey, "Extended European Search Report for EP Application No. 23189447.8", Jan. 31, 2024, EPO, Germany.

*Primary Examiner* — Syed A Islam
(74) *Attorney, Agent, or Firm* — Bridgeway IP Law Group, PLLC; Jihun Kim

(57) ABSTRACT

Proposed is a brake device for a vehicle seat, in which when a button part is pressed, an unlocking protrusion is inserted between braking members and pushes rollers of the braking members, which are positioned on wedge surfaces, to release surfaces, such that an unlocked state is implemented.

10 Claims, 12 Drawing Sheets

(56) References Cited

U.S. PATENT DOCUMENTS

| | | | |
|---|---|---|---|
| 2019/0225121 A1* | 7/2019 | Chiang | .................. B60N 2/165 |
| 2022/0324358 A1* | 10/2022 | Umezaki | .................. B60N 2/16 |
| 2023/0264608 A1* | 8/2023 | Kim | ....................... B60N 2/168 |
| | | | 296/65.16 |

FOREIGN PATENT DOCUMENTS

| KR | 10-2142008 B1 | 8/2020 |
|---|---|---|
| KR | 10-2021-0067586 A | 6/2021 |
| KR | 10-2023-0004086 A | 1/2023 |

\* cited by examiner

BRAKE DEVICE FOR VEHICLE SEAT

CROSS-REFERENCE TO RELATED APPLICATIONS

This application claims priority to and the benefit of Korean Patent Application No. 10-2023-0077499 filed in the Korean Intellectual Property Office on Jun. 16, 2023, the entire contents of which are incorporated herein by reference.

TECHNICAL FIELD

The present invention relates to a brake device for a vehicle seat.

BACKGROUND ART

In general, a stepless brake device for a vehicle seat is a component of a seat height adjustment device. A seat equipped with the seat height adjustment device may be configured to move downward in an unlocked state or move upward always when no external force is applied. The stepless brake device for a vehicle seat may maintain a locked state of the seat with respect to the seat height adjustment device or release the locked state, as necessary.

In the stepless brake device for a vehicle seat in the related art, an input member and an unlocking member are disposed on one side surface of a housing, and braking members, a fixing member, and a gear member are disposed on the other side surface of the housing. A housing cover is disposed on one side surface of the housing to surround the input member, and a plate cover is provided on the other side surface of the housing to prevent the separation of the braking member and the gear member. A plurality of coupling pieces provided on the plate cover is coupled, by caulking, to the housing cover in a state in which the housing cover and the plate cover are pressed in a direction in which the housing cover and the plate cover face each other. The unlocking member has a plurality of unlocking protrusions formed around a body thereof in an axial direction. Two opposite edges of an end of the unlocking protrusion each have an inclined surface, and a concavely rounded groove may be formed inside each of the inclined surfaces. However, in the case of the stepless brake device for a vehicle seat in the related art, an operating lever needs to be rotated to release the locked state, which makes it very difficult to manipulate the stepless brake device. Further, there is a problem in that when the unlocking protrusion having a wedge structure is inserted between the braking members to release the locked state, rollers of the braking members positioned on a wedge surface are tilted toward one side when the rollers of the braking members are pushed by the unlocking protrusion and moved toward a release surface.

Document of Related Art

Patent Document (Patent Document 1) Korean Patent Application Laid-Open No. 10-2023-0004086 (published on Jan. 6, 2023)

SUMMARY OF THE INVENTION

The present invention has been made in an effort to solve the above-mentioned problem, and an object of the present invention is to provide a brake device for a vehicle seat, in which a locked state of a braking member may be released by pressing a button part.

To achieve the above-mentioned object, the present invention provides a brake device for a vehicle seat, the brake device including: a housing having one surface having a through-hole, and the other surface configured as an opening portion; an unlocking member inserted into the housing through the opening portion and including a button part inserted into the through-hole and provided on one surface of the unlocking member that is directed toward the housing, the unlocking member having a plurality of unlocking protrusions provided along an edge of the other surface of the unlocking member; a first elastic member disposed inside the unlocking protrusion and configured to elastically support the unlocking member; a brake ring coupled to the other surface of the housing and having release surfaces and wedge surfaces alternately formed along an inner-diameter portion of the brake ring, the brake ring having a plurality of braking members disposed along the inner-diameter portion of the brake ring; and a gear member having a seating groove provided in one surface of a brake drum inserted into the brake ring so that the first elastic member is seated in the seating groove, in which when the button part is pressed, the unlocking protrusions are inserted between the braking members and push rollers of the braking members, which are positioned on the wedge surfaces, to the release surfaces, such that an unlocked state is implemented.

The braking member may include a second elastic member, and the rollers may be provided at two opposite ends of the second elastic member.

The unlocking protrusion may be configured to have a width that decreases toward the roller, and a contact surface, which comes into contact with the roller, may be configured as a round portion that conforms to the roller.

A pressing protrusion configured to press the roller may be provided on a surface in the housing that is directed toward the roller.

The pressing protrusion may be positioned to be biased toward an edge from a center of the roller.

The unlocking member may have a stepped portion formed at a boundary with the button part, and the stepped portion may be caught by an opposing surface in the housing.

A cover may be connected to the housing, and the brake ring may be positioned between the housing and the cover.

The brake drum may be integrated with the gear member, or the brake drum may be structured to be separably coupled to the gear member.

The gear member may have a gear provided at a side opposite to the brake drum.

The gear may penetrate a center of the cover and be exposed to the outside.

According to the present invention, the locked state of the braking member may be released by pressing the button part, which may provide convenience of use.

The present invention may implement the compact brake device for a vehicle.

The present invention may reduce the number of unnecessary components.

The foregoing summary is illustrative only and is not intended to be in any way limiting. In addition to the illustrative aspects, embodiments, and features described above, further aspects, embodiments, and features will

Figure 1:
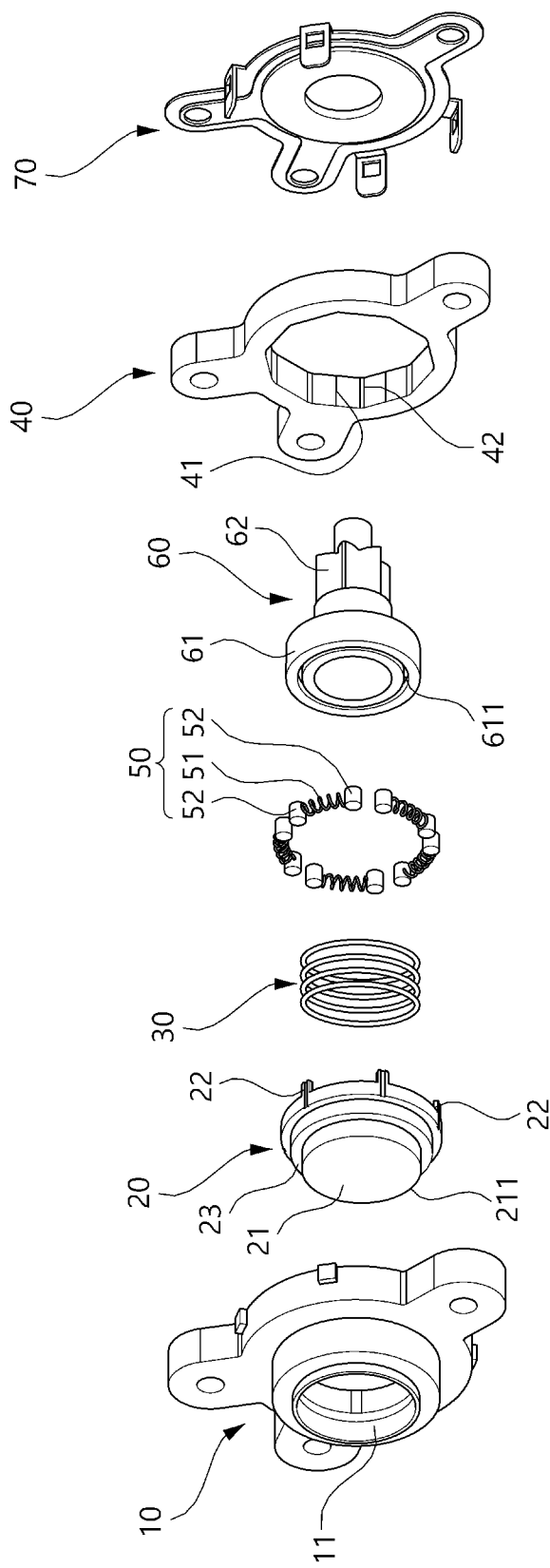
FIG. 1 is an exploded perspective view of a brake device for a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
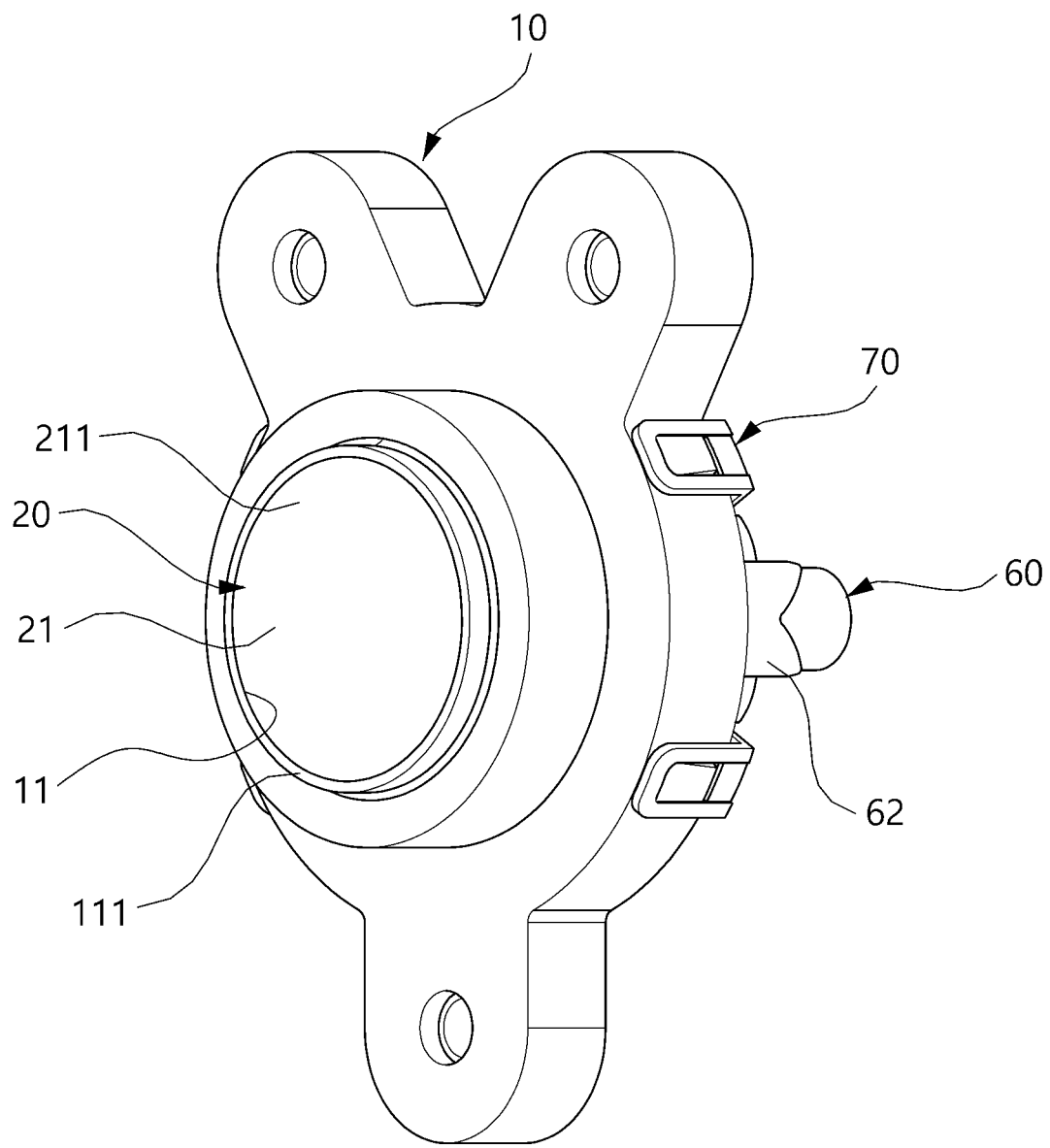
FIG. 2 is a perspective view of the brake device for a vehicle seat according to the exemplary embodiment of the present invention when viewed in a direction of a button.
Figure 3:
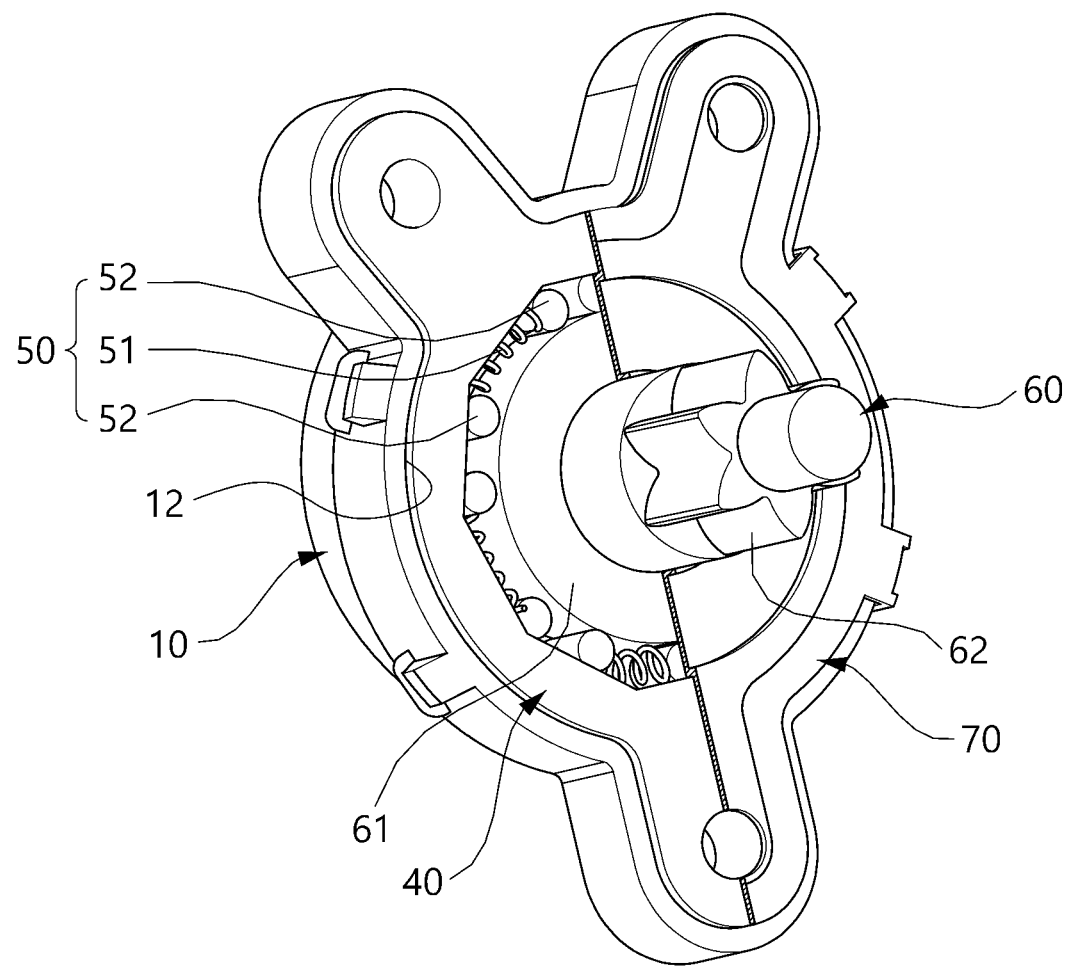
FIG. 3 is a perspective view of the brake device for a vehicle seat according to the exemplary embodiment of the present invention when viewed in a direction of a gear member.
Figure 4:
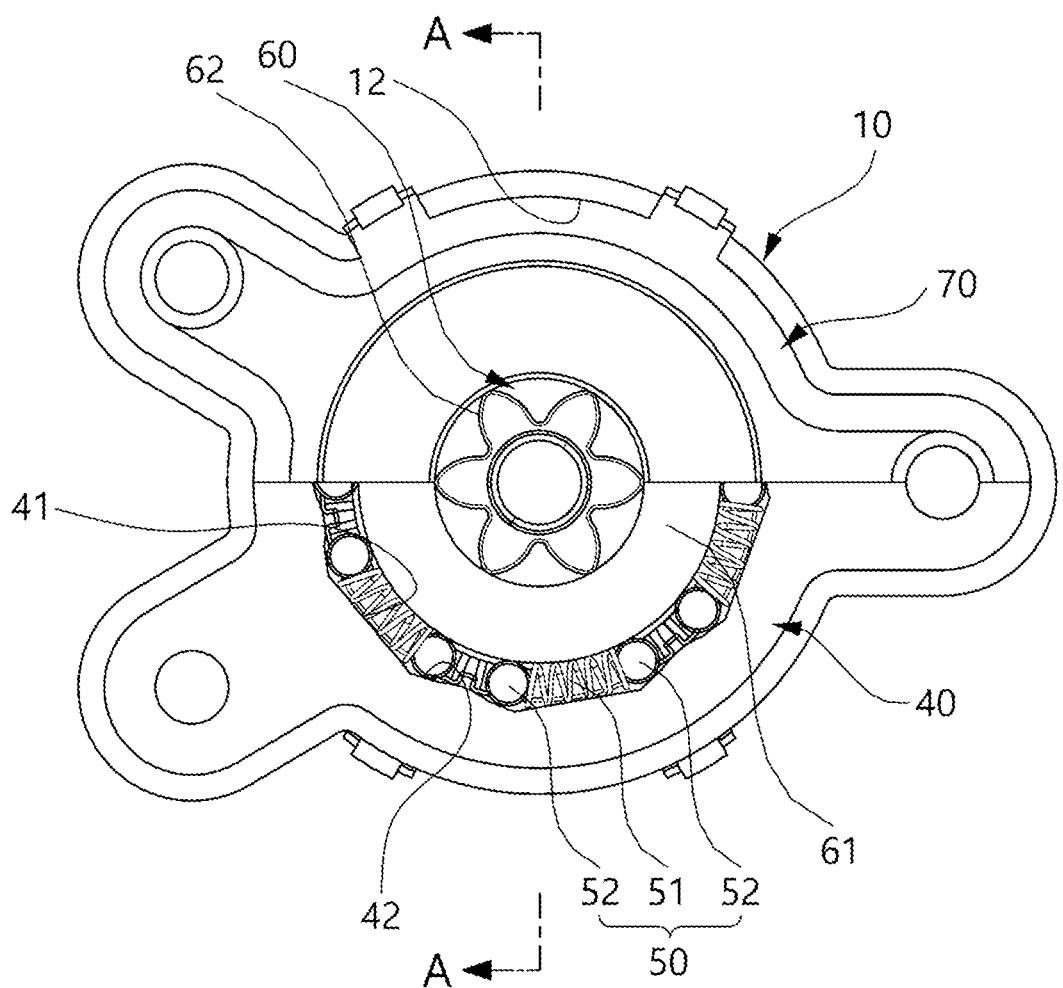
FIG. 4 is a side view of the brake device for a vehicle seat according to the exemplary embodiment of the present invention when viewed in the direction of a gear member direction.
Figure 5:
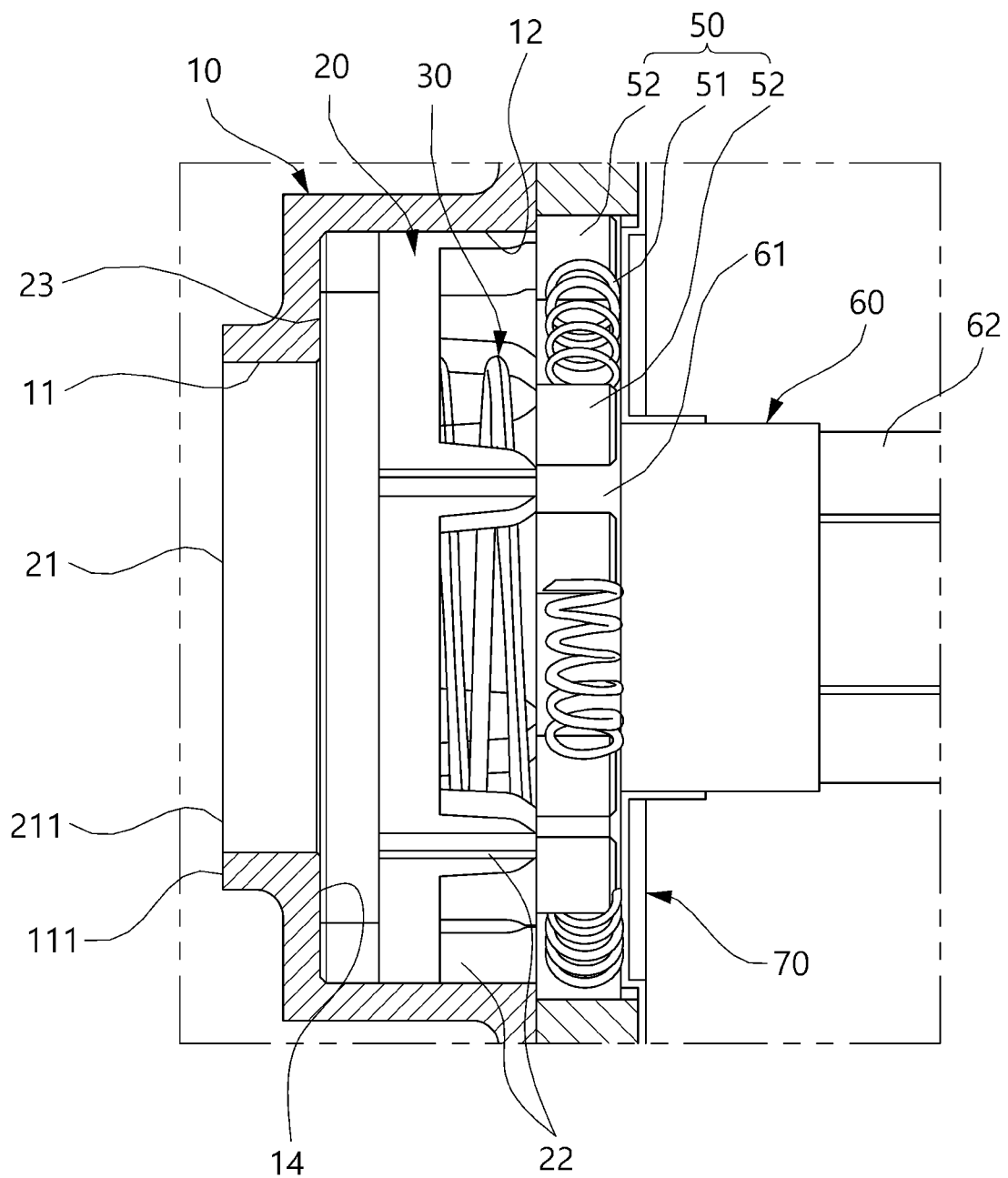
FIG. 5 is a cross-sectional view taken along line A-A in FIG. 4.
Figure 6:
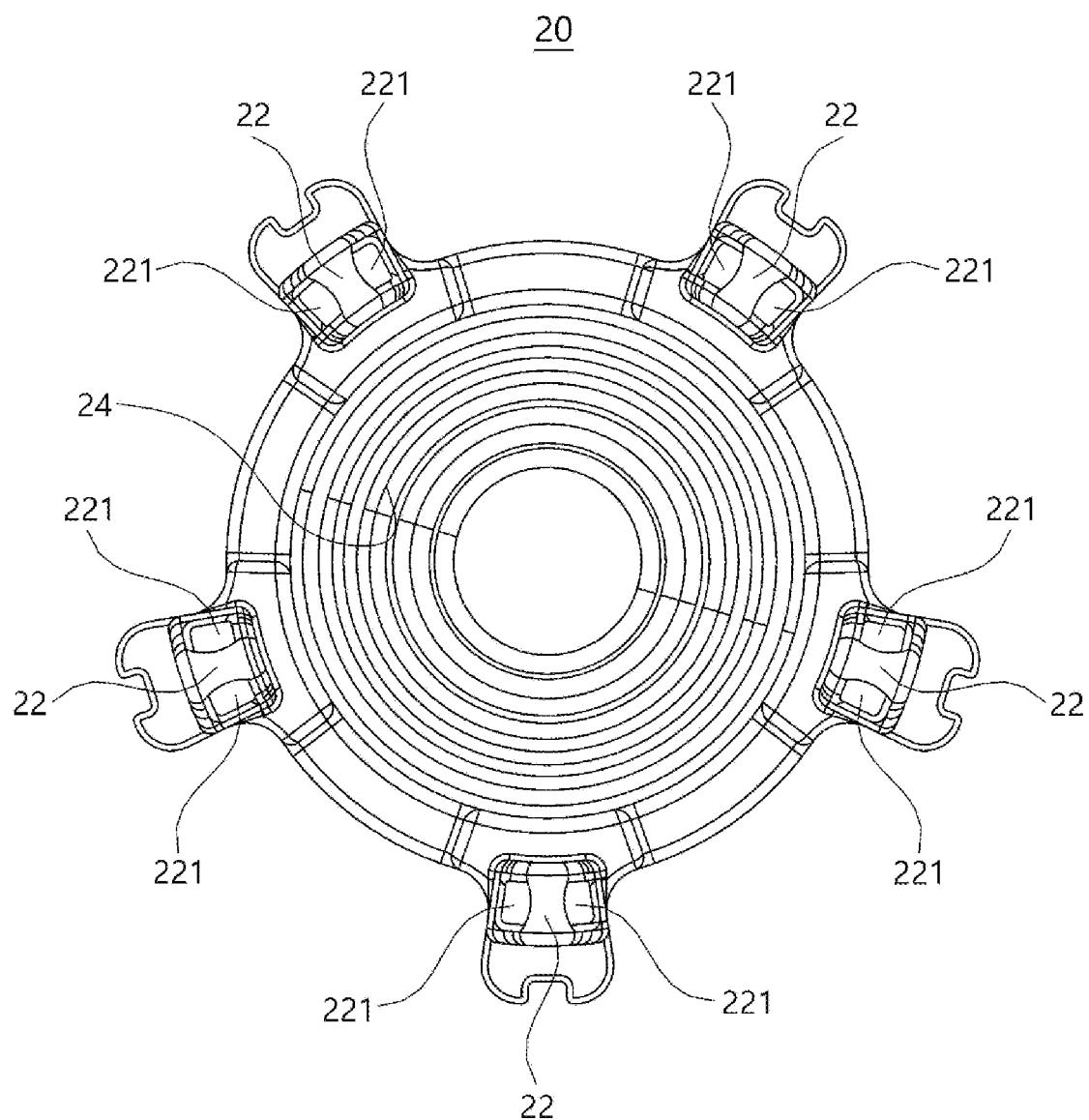
FIG. 6 is a side view of an unlocking member according to the exemplary embodiment of the present invention.

FIG. 1 is an exploded perspective view of a brake device for a vehicle seat according to an exemplary embodiment of the present invention, FIG. 2 is a perspective view of the brake device for a vehicle seat according to the exemplary embodiment of the present invention when viewed in a direction of a button, FIG. 3 is a perspective view of the brake device for a vehicle seat according to the exemplary embodiment of the present invention when viewed in a direction of a gear member, FIG. 4 is a side view of the brake device for a vehicle seat according to the exemplary embodiment of the present invention when viewed in the direction of a gear member direction, FIG. 5 is a cross-sectional view taken along line A-A in FIG. 4, and FIG. 6 is a side view of an unlocking member according to the exemplary embodiment of the present invention.

As illustrated in FIGS. 1 to 6, the present invention includes a housing 10, an unlocking member 20 inserted into the housing 10, a first elastic member 30 configured to elastically support the unlocking member 20, a brake ring 40 coupled to the housing 10, braking members 50 provided along an inner-diameter portion of the brake ring 40, a gear member 60 coupled to the inner-diameter portion of the brake ring 40, and a cover 70 connected to the housing 10.

A through-hole 11 may be provided at a center of one surface of the housing 10. A button part 21 of the unlocking member 20 may be inserted into the through-hole 11. The other surface of the housing 10 may be configured as an opening portion 12. The unlocking member 20 may be coupled to the interior of the housing 10 through the opening portion 12.

An opposing surface 14 may be provided at a boundary of the through-hole 11 in the housing 10. A stepped portion 23 of the unlocking member 20 may be caught by the opposing surface 14. The opposing surface 14 may prevent an end surface 211 of the button part 21 of the unlocking member 20 from further protruding than an end surface 111 of the through-hole 11.

For example, when the button part 21 is inserted into the through-hole 11, the end surface 111 of the through-hole 11 may coincide with the end surface 211 of the button part 21.

The unlocking member 20 may be assembled to be inserted into the housing 10 in a state in which the button part 21 is directed toward the opening portion 12 of the housing 10.

The button part 21 may protrude from one surface of the unlocking member 20 that is directed toward the housing 10. The unlocking member 20 may have a plurality of unlocking protrusions 22 provided along an edge of the other surface of the unlocking member 20.

One end of the first elastic member 30 is inserted into a seating groove 24 positioned inside the unlocking protrusion 22, such that the first elastic member 30 may elastically support the unlocking member 20 (see FIG. 6). For example, the first elastic member 30 may be a return spring.

The gear member 60 may have a brake drum 61. The brake drum 61 may be inserted into the brake ring 40 so as to define concentricity with the interior of the brake ring 40.

A seating groove 611 may be provided in a surface of the brake drum 61 that is directed toward the first elastic member 30. The other end of the first elastic member 30 may be seated in the seating groove 611. The first elastic member 30 may be stably compressed or extended in a state in which the other end of the first elastic member 30 is inserted into the seating groove 611.

For example, the brake drum 61 may be integrated with the gear member 60, or the brake drum 61 may be structured to be separably coupled to the gear member 60.

The gear member 60 may have a gear 62. For example, the gear 62 may be a pinion gear.

The gear 62 may be provided at a side opposite to the brake drum 61. The gear 62 may penetrate a center of the cover 70 and be exposed to the outside.

The gear 62 may penetrate the center of the cover 70 and be exposed to the outside so as to be rotatable. The gear 62 may engage with a gear device (not illustrated) that operates in conjunction with the vehicle seat.

When the button part 21 is pressed, the first elastic member 30 may be compressed by being pushed by the unlocking member 20 in a direction of the brake drum 61.

When a force, which presses the button part 21, is eliminated, the first elastic member 30 may push the unlocking member 20 in a direction of the through-hole 11 while being extended to an original state. When the first elastic member 30 is extended, the end surface 211 of the button part 21 may coincide with the end surface 111 of the through-hole 11.

The cover 70 may be connected to the housing 10. The brake ring 40 may be positioned between the housing 10 and the cover 70 in an assembled state. The cover 70 may prevent the separation of the brake ring 40.

FIG. 6 illustrates that five unlocking protrusions 22 are provided on the unlocking member 20. However, the present invention is not limited thereto. Six or more unlocking protrusions 22 may be provided on the unlocking member 20.

Figure 7:
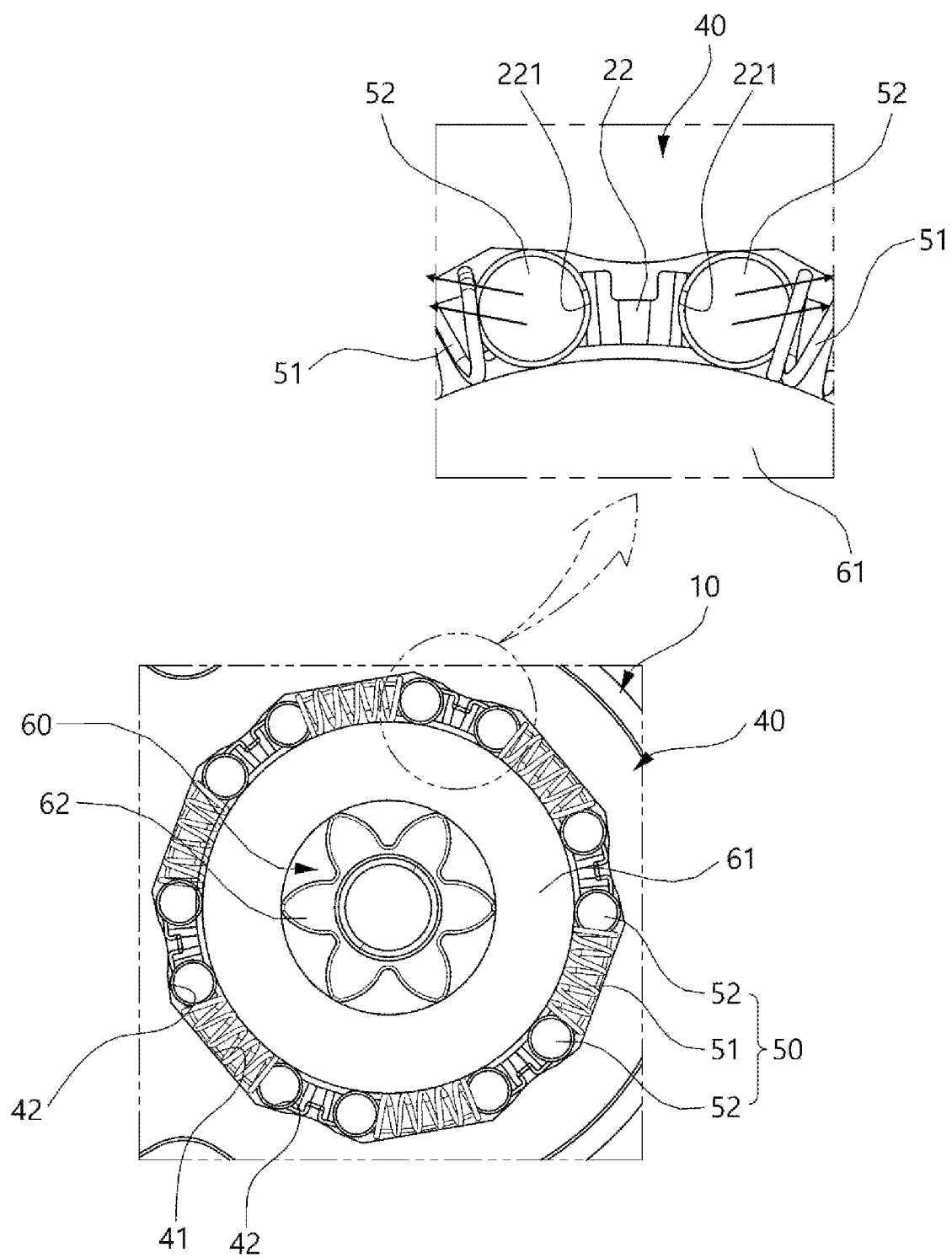
FIG. 7 is a view illustrating a state in which braking members according to the exemplary embodiment of the present invention are coupled.

FIG. 7 is a view illustrating a state in which the braking members according to the exemplary embodiment of the present invention are coupled.

As illustrated in FIG. 7, the brake ring 40 may be coupled to the other surface of the housing 10. The brake ring 40 may have release surfaces 41 and wedge surfaces 42 alternately formed along the inner-diameter portion of the brake ring 40.

The braking member 50 may include a second elastic member 51, and rollers 52 provided at two opposite ends of the second elastic member 51. For example, the second elastic member 51 may be a spring.

As illustrated in FIG. 7, the elastic member 51 may be disposed at a center of the release surface 41. The elastic member 51 may elastically support the rollers 52 so that the rollers 52 provided at the two opposite ends of the elastic member 51 may be fitted between the wedge surface 42 and the outer-diameter portion of the brake drum 61.

The unlocking protrusions 22 are inserted between the braking members 50 when the button part 21 is pressed, such that the rollers 52 of the two opposite braking members 50 may be moved from the wedge surfaces 42 to the release surfaces 41 by being pushed by the unlocking protrusions 22.

Because an interval between the release surface 41 and the outer-diameter portion of the brake drum 61 is larger than the outer-diameter portion of the roller 52, the roller 52 positioned on the release surface 41 may freely move.

The unlocking protrusion 22 may have a structure having a width that decreases toward an end of the unlocking protrusion 22 directed toward the roller 52.

Because the unlocking protrusion 22 has the structure having a width that decreases toward the end of the unlocking protrusion 22 directed toward the roller 52, the contact with the roller 52 of the unlocking protrusion 22 may be gradually performed without being rapidly performed.

Therefore, the rollers 52 may be stably pushed by the unlocking protrusions 22 when the button part 21 is pressed.

Two opposite contact surfaces of the unlocking protrusion 22, which come into contact with the roller 52, may be configured as round portions 221 that conform to the outer-diameter portion of the roller 52.

Figure 10:
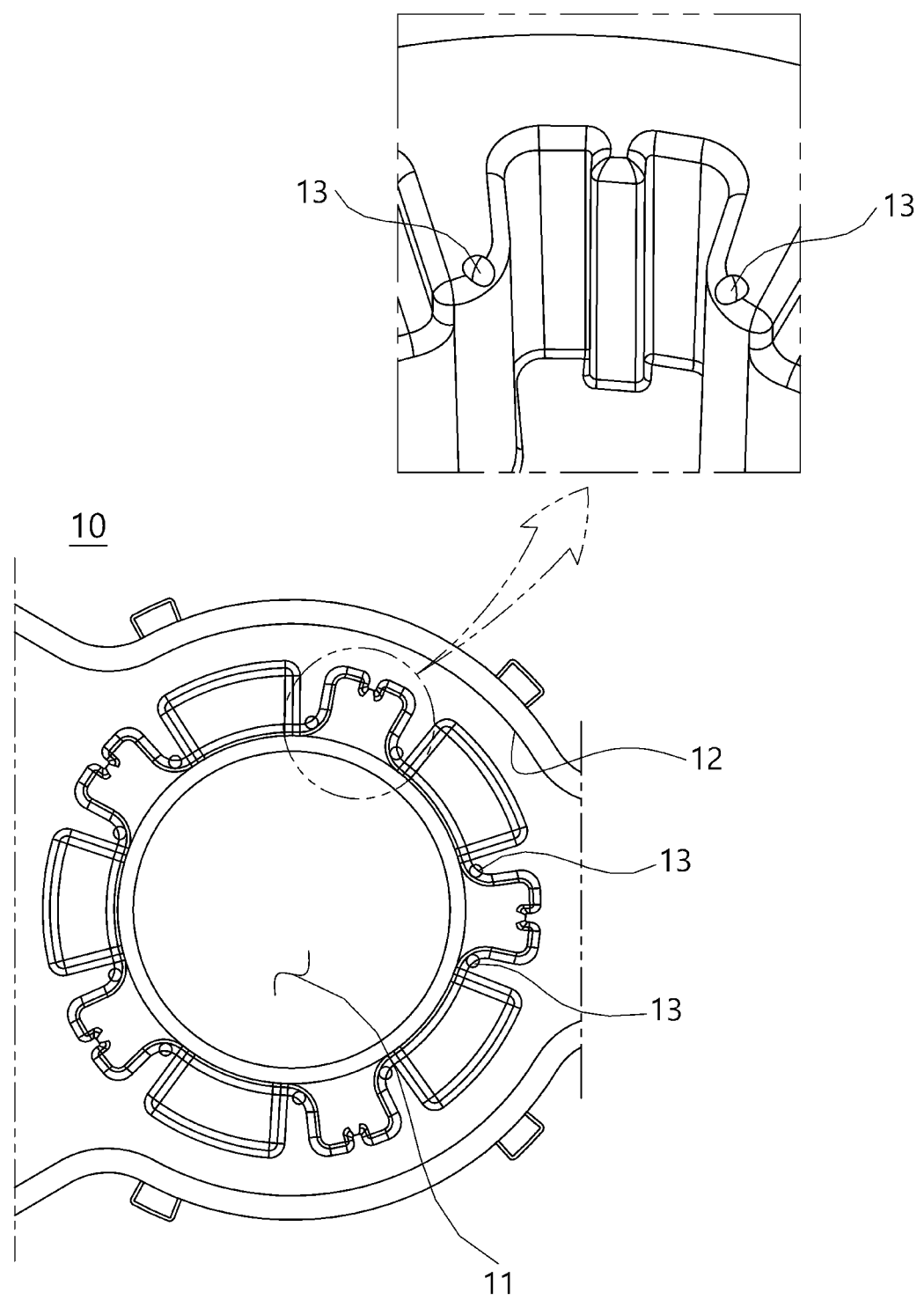
FIG. 10 is a view illustrating a pressing protrusion of a housing according to the exemplary embodiment of the present invention.
Figure 11:
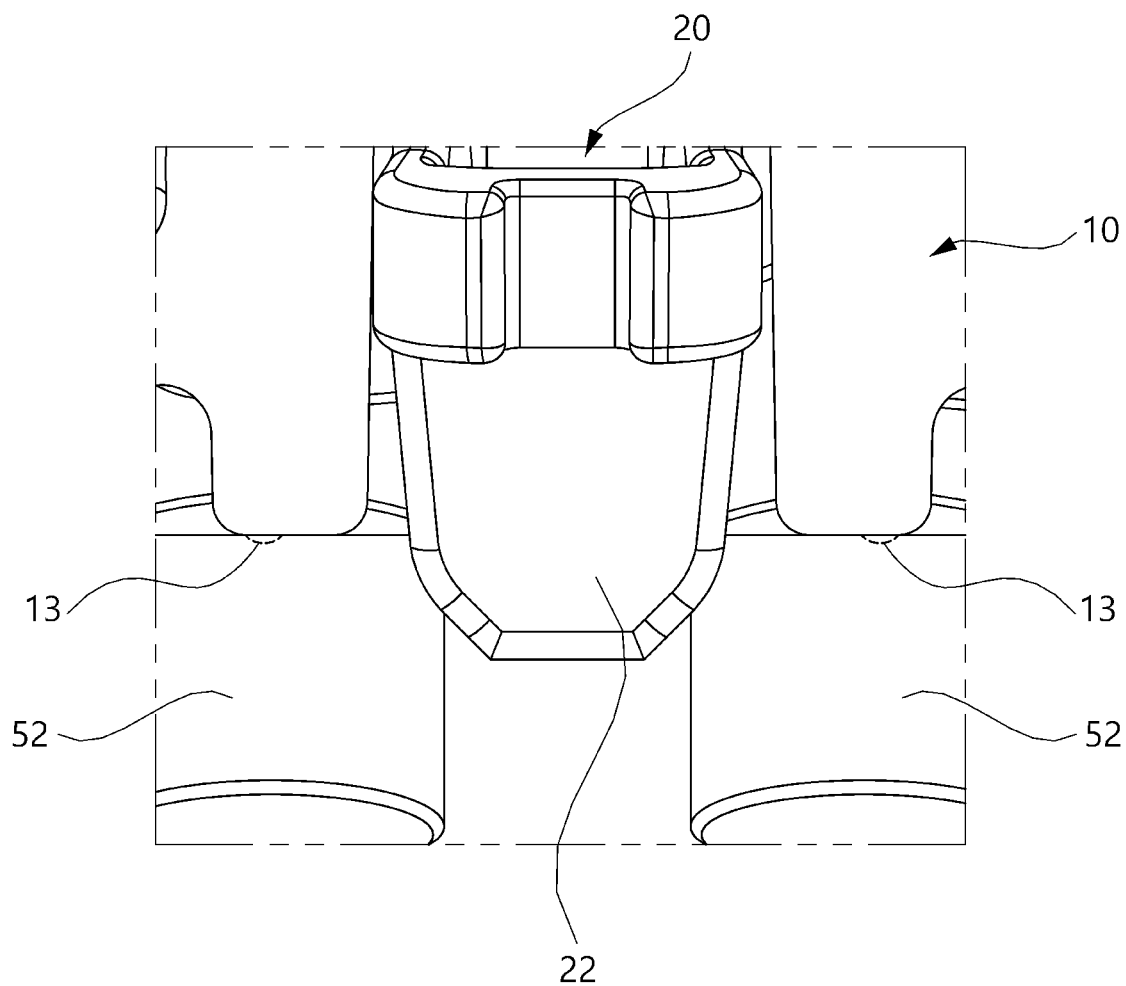
FIGS. 11 and 12 are views illustrating a pressed state of a roller made by the pressing protrusion according to the exemplary embodiment of the present invention.
Figure 12:
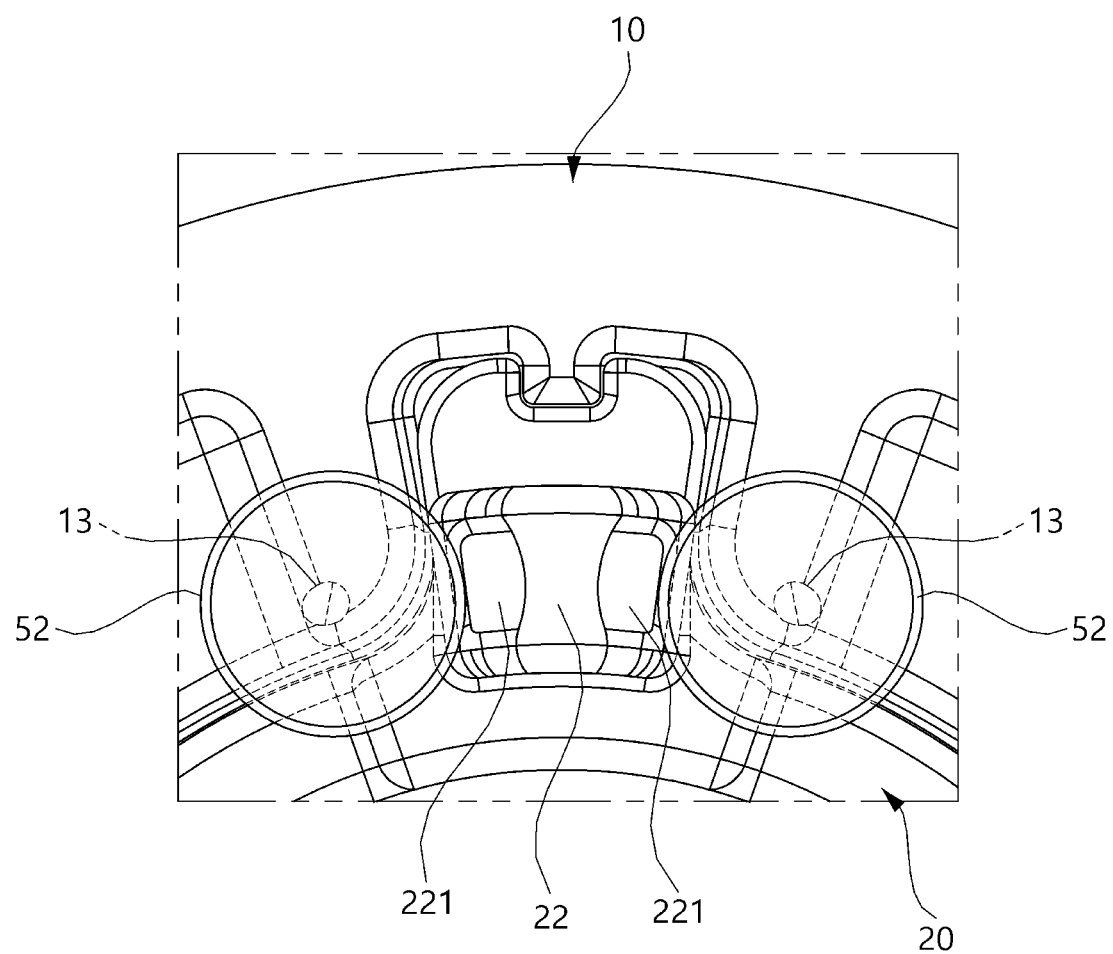

FIG. 10 is a view illustrating a pressing protrusion of a housing according to the exemplary embodiment of the present invention, and FIGS. 11 and 12 are views illustrating a pressed state of a roller made by the pressing protrusion according to the exemplary embodiment of the present invention.

As illustrated in FIGS. 10 to 12, the housing 10 may have pressing protrusions 13. The pressing protrusion 13 may protrude from a surface in the housing 10 that is directed toward the roller 52. For example, the pressing protrusion 13 may have an embossed or gradient shape.

The pressing protrusion 13 may be positioned to be biased toward an edge of the roller 52 from a center of the roller 52.

For example, because the unlocking protrusion 22 has the structure having a width that decreases toward the end of the unlocking protrusion 22 directed toward the roller 52, the rollers 52 of the two opposite braking members 50 may be inclined while being spread toward two opposite sides when being pressed by the unlocking protrusions 22. However, the pressing protrusions 13 push the rollers 52 to prevent the rollers 52 from being inclined, such that the rollers 52 may be prevented from being inclined. Therefore, the rollers 52 may be stably pushed by the unlocking protrusions 22.

Next, the operations of the unlocking member and the brake members when the button part of the present invention is pressed will be described.

Figure 8:
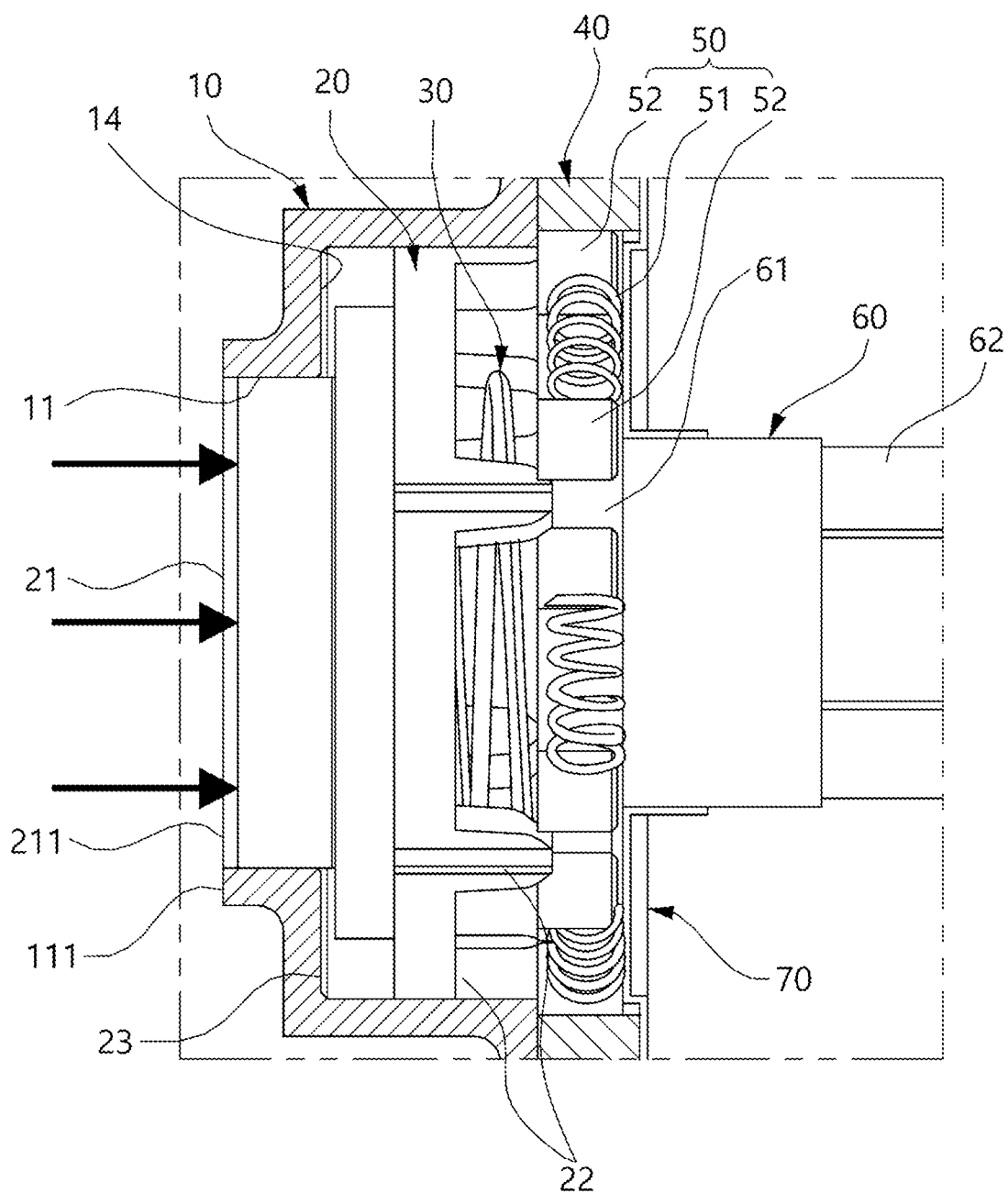
FIG. 8 is a cross-sectional view illustrating a pressed state of a button part of an unlocking member according to the exemplary embodiment of the present invention.
Figure 9:
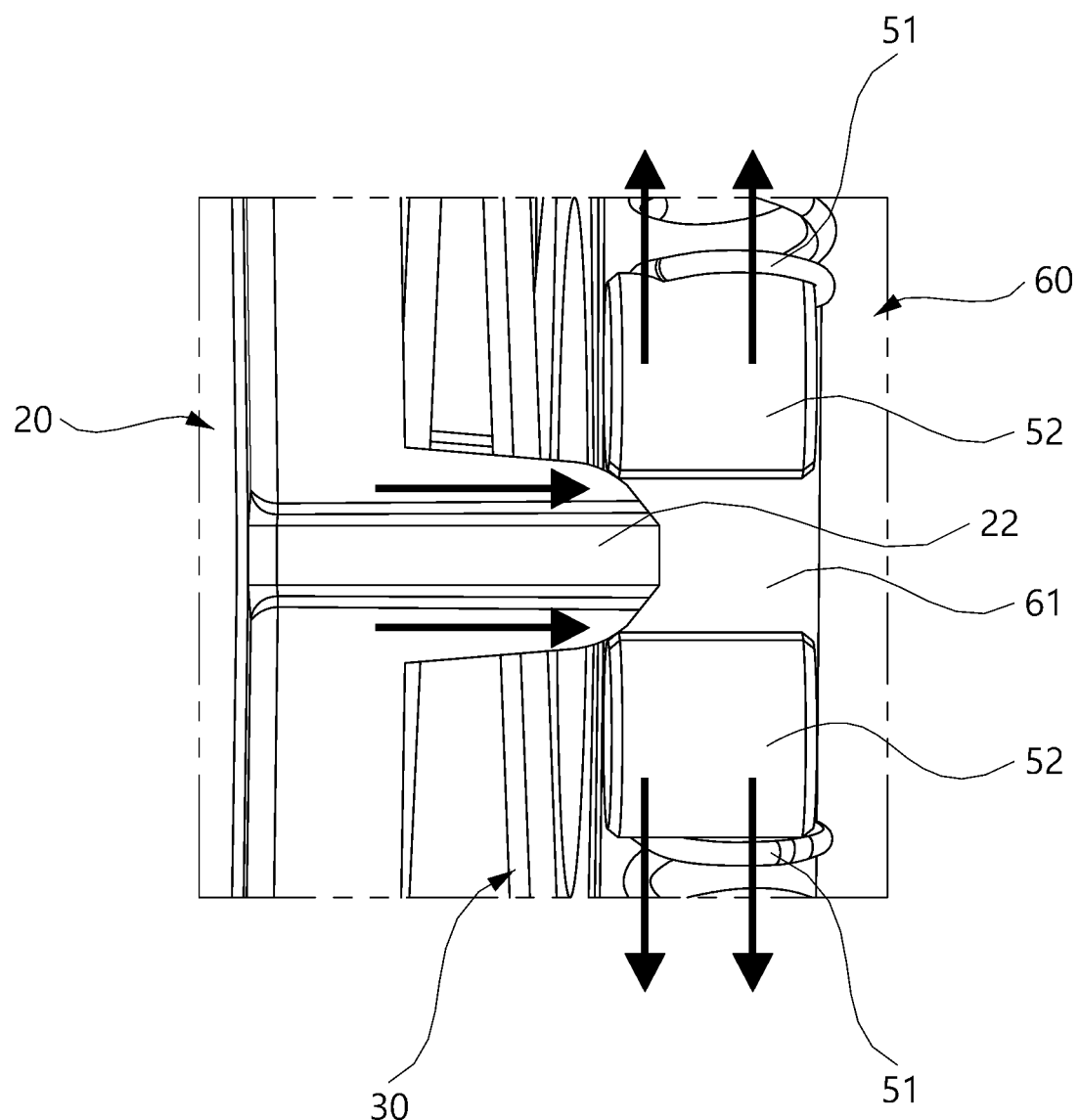
FIG. 9 is a view illustrating an operation of an unlocking protrusion when the button part according to the exemplary embodiment of the present invention is pressed.

FIG. 8 is a cross-sectional view illustrating a pressed state of the button part of the unlocking member according to the exemplary embodiment of the present invention, and FIG. 9 is a view illustrating an operation of the unlocking protrusion when the button part according to the exemplary embodiment of the present invention is pressed.

As illustrated in FIGS. 8 and 9, when the button part 21 is pressed, the unlocking member 20 may move in the direction of the braking member 50 while pressing the first elastic member 30.

As the unlocking member 20 moves in the direction of the braking member 50, the unlocking protrusion 22 may be inserted between the two opposite braking members 50.

As the unlocking protrusion 22 is inserted between the two opposite braking members 50, the rollers 52 of the two opposite braking members 50, which are positioned on the wedge surfaces 42 by elasticity of the second elastic members 51, may be moved to the release surfaces 41 by being pushed by the unlocking protrusion 22.

The second elastic members 51, which elastically support the rollers 52, may be compressed during a process in which the rollers 52 of the two opposite braking members 50 are moved to the release surfaces 41 by being pushed by the unlocking protrusions 22.

A state in which the seat height may be adjusted may be implemented as the rollers 52 are moved to the release surfaces 41 by being pushed by the unlocking protrusions 22. A state in which the gear member 60 may freely rotate may be maintained when the seat moves upward or downward to adjust the seat height.

The released state, in which the seat height may be adjusted, may be implemented as the gear 62 of the gear member 60 may rotate in the state in which the gear 62 engages with the gear device (not illustrated).

Because the roller 52 is pressed by the pressing protrusion 13 provided on the housing during the process in which the roller 52 is moved to the release surface 41 by being pushed by the unlocking protrusion 22, the roller 52 may stably move to the release surface 41 without being tilted toward one side.

When the force, which presses the button part 21, is eliminated, the compressed first elastic member 30 may be extended, and the unlocking member 20 may be pushed in a release direction.

As the unlocking member 20 is pushed in the release direction, the unlocking protrusion 22 positioned between the two opposite braking members 50 may be separated from the portion between the two opposite braking members 50.

As the unlocking protrusion 22 is separated from the portion between the two opposite braking members 50, the second elastic member 51, which is compressed by being pushed by the unlocking protrusion 22, may be extended and move the rollers 52, which are positioned on the release surfaces 41, to the wedge surfaces 42.

As the roller 52 is returned to the wedge surface 42 and inserted between the wedge surface 42 and the outer-diameter portion of the brake drum 61, the rotation of the gear member 60 may be restricted. The rotation of the gear 62 may also be restricted as the rotation of the gear member 60 is restricted. Therefore, the gear device, which engages with the gear 62 of the gear member 60, is fixed, such that a locked state in which the seat height cannot be adjusted may be implemented. For example, the gear device may be a rack gear.

For example, the brake device of the present invention may serve as a brake for fixing a height of a seat (not illustrated) in the locked state. The locked state is released when the button part 21 of the present invention is pressed. When a vehicle occupant is seated in the seat in the unlocked state, a load of the vehicle occupant is applied to the seat, such that the gear 62 of the gear member 60 may rotate in a seat lowering direction. As the gear 62 rotates in the seat lowering direction, the seat connected to the gear device may be moved downward by the operation of the gear device engaging with the gear 62. When the force, which presses the button part 21, is eliminated, the rotation of the gear 62 is restricted, and the seat, which is moving downward, may be stopped at a desired height. In a state in which no load is applied to the seat (a vehicle occupant is not seated in the seat), the seat may be positioned at a highest height by an elastic force of an elastic device such as a spring.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A brake device for a vehicle seat, the brake device comprising:
    a housing including a first surface having a through-hole, and a second surface having an opening portion;
    an unlocking member configured to be inserted into the housing through the opening portion and including a button part configured to be inserted into the through-hole and positioned on a first surface of the unlocking member that is directed toward the housing, the unlocking member having a plurality of unlocking protrusions disposed along an edge of a second surface of the unlocking member;
    a first elastic member disposed inside the plurality of unlocking protrusions and configured to elastically support the unlocking member;
    a brake ring coupled to the second surface of the housing and having release surfaces and wedge surfaces alternately formed along an inner-diameter portion of the brake ring, the brake ring having a plurality of braking members disposed along the inner-diameter portion of the brake ring; and
    a gear member having a seating groove formed in one surface of a brake drum configured to be inserted into the brake ring so that the first elastic member is seated in the seating groove,
    wherein when the button part is pressed, the plurality of unlocking protrusions are configured to be inserted between the plurality of braking members and push rollers of the plurality of braking members, which are positioned on the wedge surfaces, to the release surfaces, such that an unlocked state is implemented.

2. The brake device of claim 1, wherein each of the plurality of braking members comprises a second elastic member, and the rollers are disposed at two opposite ends of the second elastic member.

3. The brake device of claim 2, wherein each of the plurality of unlocking protrusions has a width that decreases toward a roller, and a contact surface configured to contact with the roller and having a round portion that conforms to the roller.

4. The brake device of claim 2, wherein the housing includes a pressing protrusion configured to press a roller and disposed on a surface of the housing that is directed toward the roller.

5. The brake device of claim 4, wherein the pressing protrusion is positioned to be biased toward an edge from a center of the roller.

6. The brake device of claim 1, wherein the unlocking member has a stepped portion formed at a boundary with the button part, and the stepped portion is configured to be caught by an opposing surface of the housing.

7. The brake device of claim 1, further comprising a cover that is connected to the housing, wherein the brake ring is positioned between the housing and the cover.

8. The brake device of claim 1, wherein the brake drum is integrated with the gear member, or the brake drum is structured to be separably coupled to the gear member.

9. The brake device of claim 7, wherein the gear member has a gear disposed at a side opposite to the brake drum.

10. The brake device of claim 9, wherein the gear penetrates a center of the cover to be exposed to an outside.

* * * * *